(12) United States Patent
Studer

(10) Patent No.: US 10,904,762 B2
(45) Date of Patent: Jan. 26, 2021

(54) POWERED WHEELCHAIR REMOTE DIAGNOSTICS

(71) Applicant: Curtis Instruments, Inc., Mount Kisco, NY (US)

(72) Inventor: Manuel Studer, Solothurn (CH)

(73) Assignee: Curtis Instruments Inc., Mount Kisco, NY (US)

( * ) Notice: Subject to any disclaimer, the term of this patent is extended or adjusted under 35 U.S.C. 154(b) by 0 days.

(21) Appl. No.: 16/553,374

(22) Filed: Aug. 28, 2019

(65) Prior Publication Data

US 2020/0077264 A1  Mar. 5, 2020

Related U.S. Application Data

(60) Provisional application No. 62/727,083, filed on Sep. 5, 2018.

(51) Int. Cl.
| | | |
|---|---|---|
| *H04W 12/08* | (2009.01) | |
| *H04W 12/00* | (2009.01) | |
| *A61G 5/10* | (2006.01) | |

(52) U.S. Cl.
CPC .............. *H04W 12/08* (2013.01); *A61G 5/10* (2013.01); *H04W 12/0013* (2019.01); *A61G 2203/20* (2013.01); *A61G 2203/70* (2013.01)

(58) Field of Classification Search
CPC .... H04W 12/08; H04W 12/0013; A61G 5/10; A61G 2203/70; A61G 2203/20; H04L 63/105; H04L 63/0428
See application file for complete search history.

(56) References Cited

U.S. PATENT DOCUMENTS

| | | | | |
|---|---|---|---|---|
| 8,344,860 B2* | 1/2013 | Collins, Jr. | ........ | G08B 21/0438 |
| | | | | 340/286.07 |
| 8,670,897 B1* | 3/2014 | Ralson | ................ | G06F 11/3013 |
| | | | | 701/36 |
| 9,491,788 B1* | 11/2016 | Kasai | .................... | G06K 7/1417 |
| 10,650,621 B1* | 5/2020 | King | ........................ | H04W 4/40 |
| 2007/0164871 A1* | 7/2007 | Dionne | .................. | A61G 7/015 |
| | | | | 340/573.1 |
| 2012/0123633 A1* | 5/2012 | Uyeki | ..................... | B60L 58/12 |
| | | | | 701/33.2 |
| 2014/0052319 A1* | 2/2014 | Taylor | .................... | G07C 5/008 |
| | | | | 701/22 |
| 2014/0075015 A1* | 3/2014 | Chan | ........................ | H04L 41/14 |
| | | | | 709/224 |
| 2014/0169795 A1* | 6/2014 | Clough | ............... | G06F 19/3418 |
| | | | | 398/106 |
| 2015/0209207 A1* | 7/2015 | Cooper | .................... | A61G 5/14 |
| | | | | 701/49 |

(Continued)

*Primary Examiner* — Brian E Miller
(74) *Attorney, Agent, or Firm* — Harrington & Smith

(57) ABSTRACT

A method including a remote device establishing an encrypted communication link with a user equipment, where the user equipment is associated with a wheelchair, where the encrypted communication link is established based at least partially upon a wheelchair identifier transmitted by the remote device which identifies the wheelchair; transmitting an access level by the remote device to an access controller; and receiving data by the remote device from the wheelchair via the use equipment and a network, where the data received by the remote device is limited corresponding to the access level of the remote device transmitted to the access controller.

21 Claims, 6 Drawing Sheets

(56) References Cited

U.S. PATENT DOCUMENTS

| | | | |
|---|---|---|---|
| 2016/0052137 A1* | 2/2016 | Hyde | A61G 5/047 |
| | | | 701/24 |
| 2016/0052139 A1* | 2/2016 | Hyde | B25J 11/009 |
| | | | 701/24 |
| 2016/0243927 A1* | 8/2016 | Biderman | A61B 5/0002 |
| 2016/0367420 A1* | 12/2016 | Zerhusen | A61G 7/012 |
| 2017/0126510 A1* | 5/2017 | Jones-McFadden | |
| | | | H04L 41/0823 |
| 2018/0135987 A1* | 5/2018 | Evans | A61G 5/1054 |
| 2019/0049968 A1* | 2/2019 | Dean | G05D 1/0088 |
| 2019/0052637 A1* | 2/2019 | Dean | H04W 12/04 |
| 2019/0198168 A1* | 6/2019 | Lee | G16H 40/63 |
| 2019/0248439 A1* | 8/2019 | Wang | G05D 1/0278 |
| 2019/0365592 A1* | 12/2019 | Norton | A61H 3/04 |
| 2020/0057446 A1* | 2/2020 | Moore | A45C 15/00 |
| 2020/0077264 A1* | 3/2020 | Studer | H04L 63/0428 |
| 2020/0117184 A1* | 4/2020 | Leverenz | G05D 1/0016 |

* cited by examiner

POWERED WHEELCHAIR REMOTE DIAGNOSTICS

CROSS REFERENCE TO RELATED APPLICATION

This application claims priority under 35 USC 119(e) to U.S. provisional patent application No. 62/727,083 filed Sep. 5, 2018 which is hereby incorporated by reference in its entirety.

BACKGROUND

Technical Field

The example and non-limiting embodiments relate generally to powered wheelchair remote access and, more particularly, to remote diagnostics for a powered wheelchair.

Brief Description of Prior Developments

Various manufacturers are using telemetry technology to provide remote diagnostic functionality, i.e. data is collected and pushed to the cloud service where the client can see said data in the cloud. However, as consumers demand increased functionality, there is a need to provide improved devices/systems having increased capabilities while maintaining robust and reliable product configurations.

SUMMARY

The following summary is merely intended to be example. The summary is not intended to limit the scope of the claims.

In accordance with one aspect, an example method comprises: a remote device establishing an encrypted communication link with a user equipment, where the user equipment is associated with a wheelchair, where the encrypted communication link is established based at least partially upon a wheelchair identifier transmitted by the remote device which identifies the wheelchair, and where the remote device, as part of the encrypted communication link, communicates with a network through Internet and/or cloud computing; transmitting an access level by the remote device to an access controller, where the access controller is not located at the remote device and is not located at the user equipment; and receiving data by the remote device from the wheelchair via the use equipment and the network, where the data received by the remote device is limited corresponding to the access level of the remote device transmitted to the access controller.

In accordance with another aspect, an example embodiment is provided in an apparatus comprising: at least one processor; and at least one non-transitory memory including computer program code, the at least one memory and the computer program code configured to, with the at least one processor, cause the apparatus to: transmit an access level by the apparatus to an access controller, where the access controller is not located at the apparatus; and receive wheelchair data by the apparatus from a use equipment, where the data received by the apparatus is received via an encrypted communication link between the apparatus and the user equipment, where the remote device, as part of the encrypted communication link, communicates with a network through Internet and/or cloud computing, where the user equipment is associated with the wheelchair, where the encrypted communication link is established based at least partially upon a wheelchair identifier transmitted by the apparatus which identifies the wheelchair, and where the data received by the apparatus is limited corresponding to the access level of the apparatus transmitted by the apparatus to the access controller.

In accordance with another aspect, an example method comprises: a user equipment establishing an encrypted communication link with a remote device, where the user equipment is associated with a wheelchair, where the encrypted communication link is established based at least partially upon a wheelchair identifier received by the user equipment which identifies the wheelchair, and where the encrypted communication link comprises use of a network comprising Internet and/or cloud computing as part of the encrypted communication link; the user equipment transmitting an access level to an access controller, where the access controller is not located at the remote device and is not located at the user equipment; and the user equipment transmitting data regarding the wheelchair to the remote device, where the transmitting of the data is limited corresponding to the access level of the user equipment transmitted to the access controller.

In accordance with another aspect, an example embodiment is provided in an apparatus comprising: at least one processor; and at least one non-transitory memory including computer program code, the at least one memory and the computer program code configured to, with the at least one processor, cause the apparatus to: transmit an access level by the apparatus to an access controller, where the access controller is not located at the apparatus; and transmit data by the apparatus regarding a wheelchair to a remote device, where the transmitting of the data is limited corresponding to the access level of the apparatus transmitted to the access controller, where the data transmitted by the apparatus is transmitted via an encrypted communication link, with a network with use of Internet and/or cloud computing as part of the encrypted communication link, between the apparatus and the remote device, where the apparatus is associated with the wheelchair, where the encrypted communication link is established based at least partially upon a wheelchair identifier received by the apparatus which identifies the wheelchair.

In accordance with another aspect, an example method comprises: receiving wheelchair data by a remote device, where the wheelchair data is received by the remote device from a user equipment via an encrypted communication link through a network with use of Internet and/or cloud computing as part of the encrypted communication link, and where the wheelchair data comprises data regarding the wheelchair which is displayed on a user interface of the wheelchair; and based, at least partially, upon the receiving of the wheelchair data, displaying the data regarding the wheelchair on a display of the remote device, where the data regarding the wheelchair is displayed on the display of the remote device substantially mirroring the display of the data regarding the wheelchair on the user interface of the wheelchair. Use of a proprietary display description language reduces the need for raw data transmission, thereby reducing bandwidth requirements.

In accordance with another aspect, an example embodiment is provided in an apparatus comprising: at least one processor; and at least one non-transitory memory including computer program code, the at least one memory and the computer program code configured to, with the at least one processor, cause the apparatus to: receive wheelchair data by the apparatus, where the wheelchair data is received by the apparatus from a user equipment via an encrypted communication link through a network with use of Internet and/or cloud computing as part of the encrypted communication link, and where the wheelchair data comprises data regarding the wheelchair which are displayed on a user interface of the wheelchair; and based, at least partially, upon the receiving of the wheelchair data, displaying the data regarding the wheelchair on a display of the apparatus, where the data regarding the wheelchair is displayed on the display of the apparatus substantially mirroring the display of the data regarding the wheelchair on the user interface of the wheelchair. Use of a proprietary display description language reduces the need for raw data transmission, thereby reducing bandwidth requirements.

In accordance with another aspect, an example method comprises: establishing an encrypted communication link between a remote device and a user equipment, where the user equipment is associated with a wheelchair, where the encrypted communication link is established based at least partially upon a wheelchair identifier transmitted by the remote device which identifies the wheelchair, and where the remote device communicates through a network as part of the encrypted communication link; receiving by the remote device from the user equipment, via the encrypted communication link, wheelchair data regarding the wheelchair; receiving by the remote device from the user equipment, via the encrypted communication link, text and/or a video and/or a photograph transmitted on the encrypted communication link via the user equipment; and displaying the received text and/or a video and/or a photograph by the remote device.

In accordance with another aspect, an example embodiment is provided in an apparatus comprising: at least one processor; and at least one non-transitory memory including computer program code, the at least one memory and the computer program code configured to, with the at least one processor, cause the apparatus to: receive by the apparatus from a user equipment, via an encrypted communication link, wheelchair data regarding the wheelchair; receive, via the encrypted communication link, by the apparatus from the user equipment text and/or a video and/or a photograph transmitted on the encrypted communication link; and display the received text and/or a video and/or a photograph by the remote device, where the wheelchair data received by the apparatus via the encrypted communication link is received through a network gateway as part of the encrypted communication link, where the user equipment is associated with the wheelchair, where the encrypted communication link is established based at least partially upon a wheelchair identifier received by the apparatus which identifies the wheelchair, and where the data received by the apparatus is limited corresponding to the access level of the apparatus transmitted by the apparatus to the access controller.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
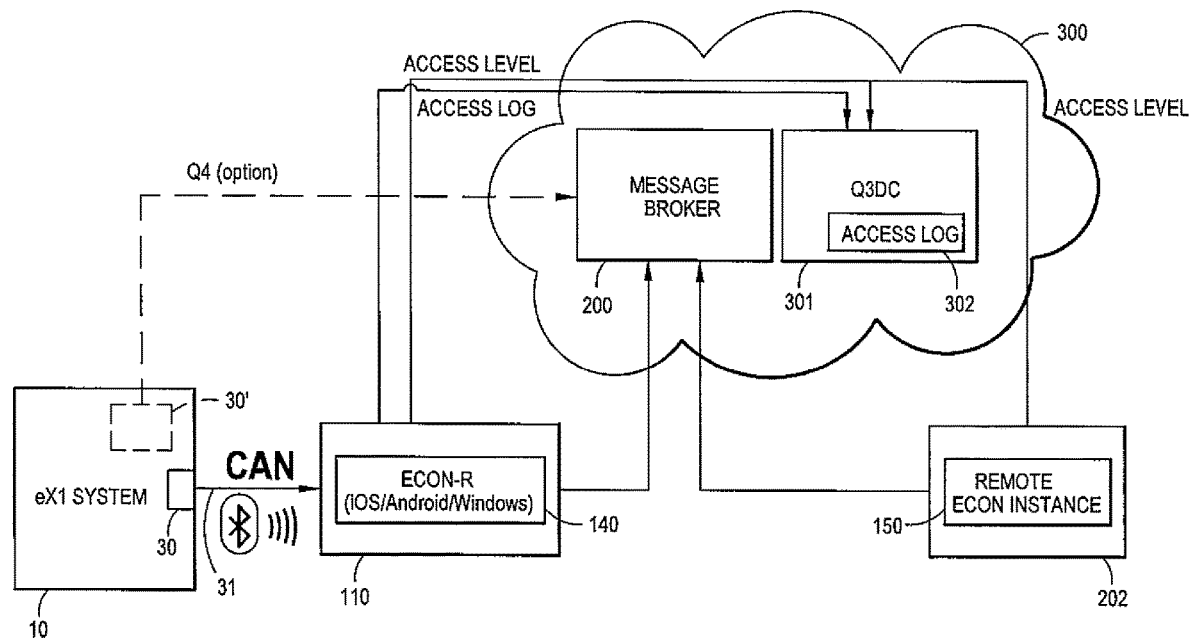
FIG. 1 is a diagram illustrating network connection of a user equipment, associated with a wheelchair, with a remote device.

Referring to FIG. 1, there is shown a diagram view of a system incorporating features of the invention. Although the invention will be described with reference to the example embodiment shown in the drawings, it should be understood that the invention can be embodied in many alternate forms of embodiments. In addition, any suitable size, shape or type of elements or materials could be used.

Various example embodiments provide access to a wheelchair configuration 10, such as through the Internet, for example, from a remote site to provide remote diagnostic functionality. This may include:
Read and write access to all configuration items
Access to all system state information (system details, error history, battery statistics, etc.)
Execution of system functions (e.g. calibration)
Monitor live system diagnostics data
Firmware update
Mirror wheelchair display
Further, various example embodiments offer a chat function and changes may be logged in a connection log.

Figure 2:
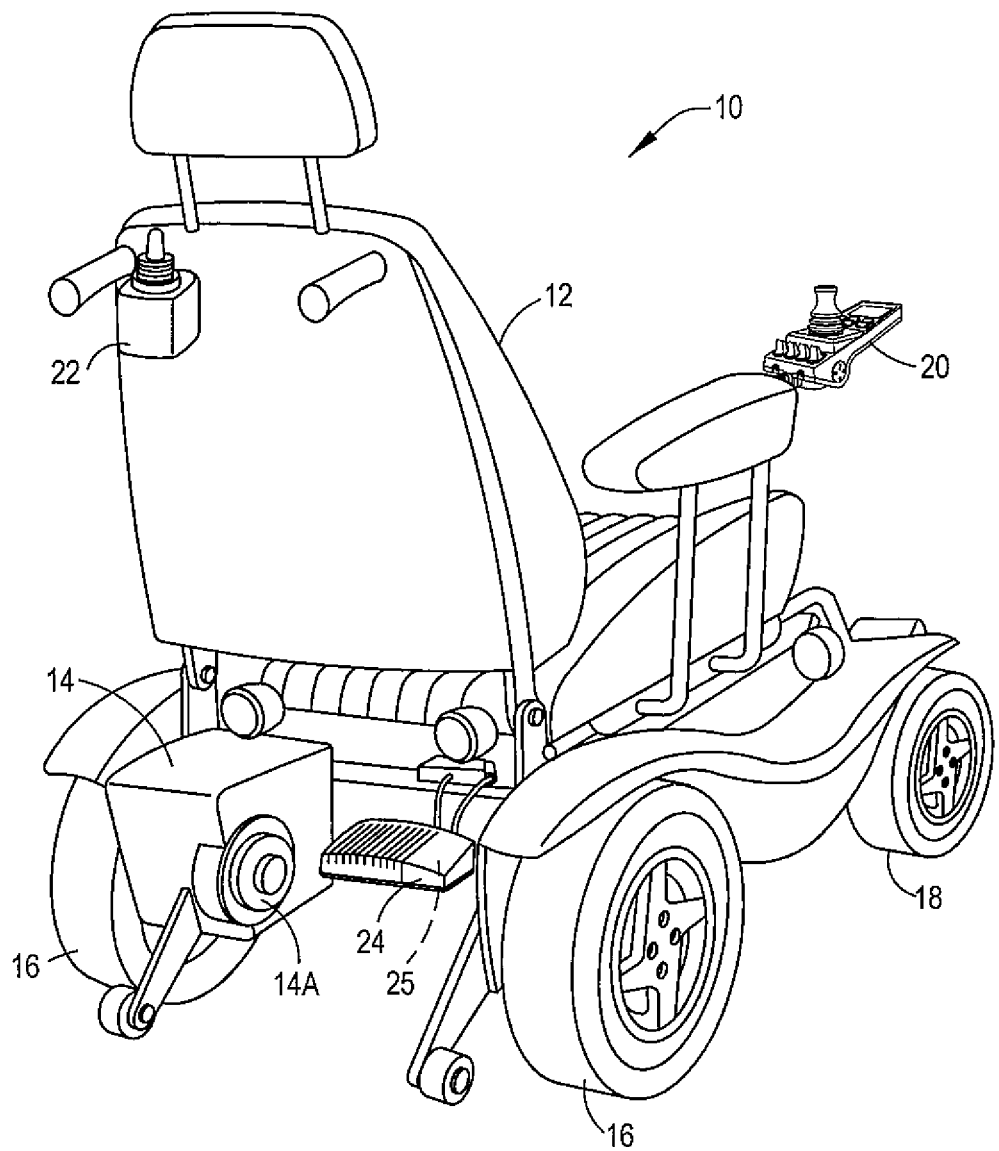
FIG. 2 is a perspective view of a personal mobility vehicle incorporating features of an example embodiment.

Referring also to FIG. 2, an example of the wheelchair or personal mobility vehicle 10 is shown. As employed herein a wheelchair 10 is considered as a vehicle that may be capable of controlled, self-powered (e.g., battery powered) movement for a sitting person.

The wheelchair 10 generally comprises a seat portion 12, a power source 14, such as a battery and related power conversion, conditioning and recharging circuitry, and at least two wheels 16 that are driven by the power source 14 via at least one motor 14A. One or more other wheels 18 provide stability and enable steering of the wheelchair system 10. In this regard there is a user-actuated hand control system (or user interface) 20. An attendant control system 22 may also be provided. The control system 20 operates with a control system of controller (or control unit) 24 to provide functions that include, but need not be limited to, starting and stopping motive power to the drive wheels 16, controlling the direction of rotation and speed of rotation of the drive wheels 16, and controlling a pointing direction of the wheels 18 to provide steering of the wheelchair 10.

Figure 3:
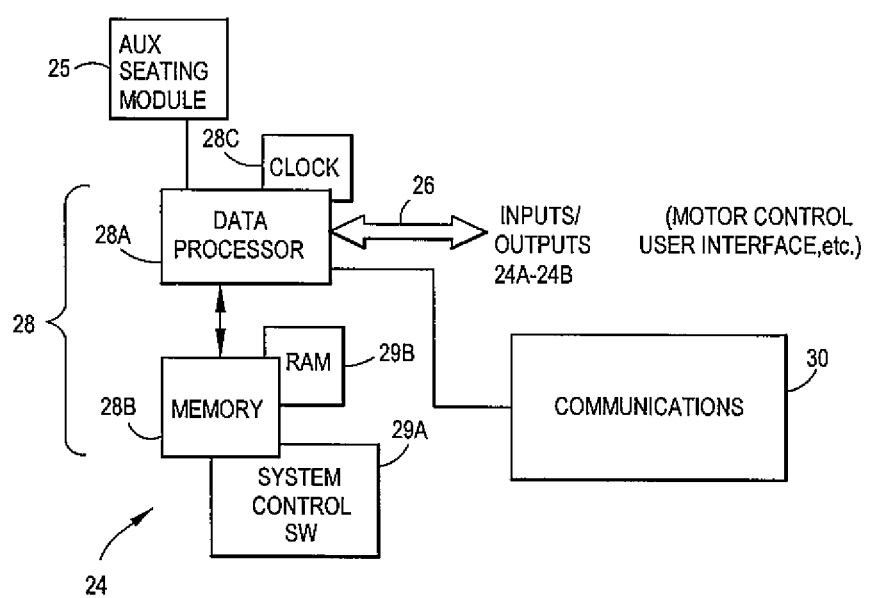
FIG. 3 is a simplified block diagram of a portion of a controller used in the personal mobility vehicle shown in FIG. 2.

FIG. 3 shows a simplified block diagram of a portion of the controller 24. The controller 24 can be assumed to include a software system 28 that includes at least one data processor 28A, such as a microprocessor or microcontroller, and a memory 28B that stores programs to control operation of the data processor 28A and, thereby, to control the overall operation of the wheelchair 10. The operating programs, also referred to as system control software (SW) 29A, may include firmware, such as computer programs that are permanently stored in, by example, non-volatile flash memory, or system control SW 29A may be stored in volatile random access memory (RAM) 29B that is loaded from an SD card or flash type of memory storage medium. The example embodiments of this invention are also usable with a system where a system control SW 29A is stored in a mass memory device, such as SD card(s) and/or flash memory(ies), and loaded into RAM as needed.

The data processor 28A is coupled via general use input/output hardware 26 to various input/outputs, including general input/outputs, such as input/outputs 24A going to and from the user-actuated hand control system 20 and inputs/outputs 24B providing control to the motor(s) 14. A clock function or module 28C can be included for maintaining an accurate time of day and calendar function.

According to some example embodiments, the controller 24 may further be connected to a communications section 30 such as a wired or wireless interface, such as a BLUETOOTH™ interface, for example. However, any suitable type of wired or wireless interface or connection may be provided.

Figure 4:
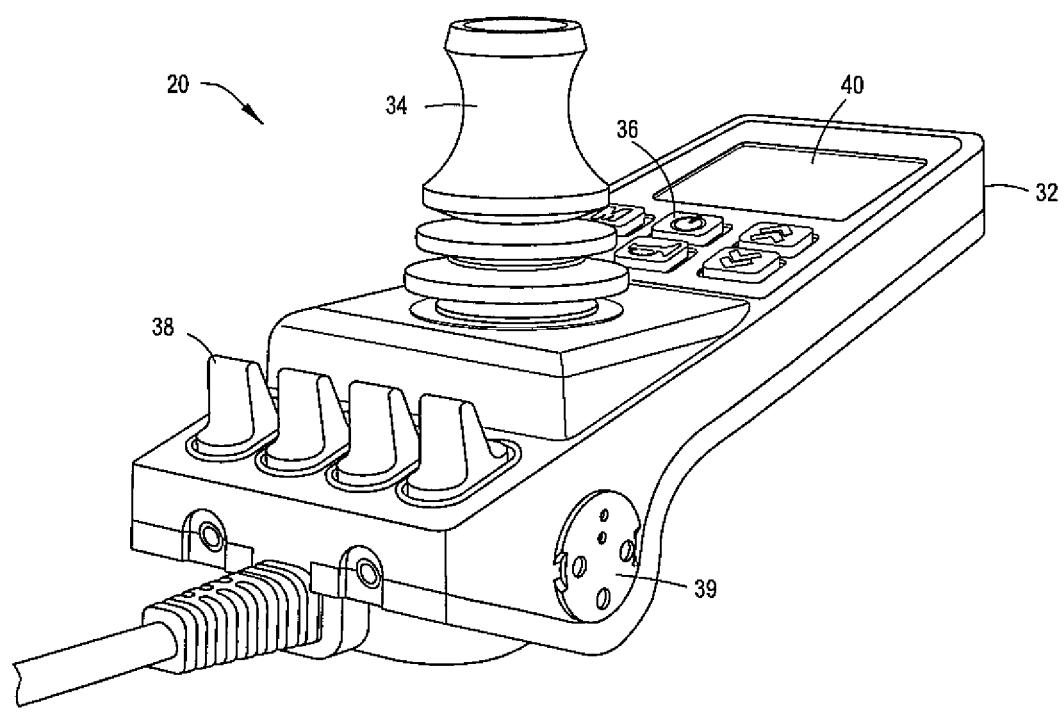
FIG. 4 is a perspective view of a personal mobility vehicle hand control used in the personal mobility vehicle shown in FIG. 2.

Referring now also to FIG. 4, the user-actuated hand control system (or user interface) 20 includes a housing 32, a joystick type controller 34, a first keypad 36, a second keypad 38, a charger port 39, and a display 40, such as an LCD, LED or other suitable type of display system. The first keypad 36 is located in front of the joystick 34 (and between the joystick 34 and the display 40). The second keypad 38 is located behind (or on the rear side of) the joystick 34. Each of the keys on the keypad 36, 38 may comprise any suitable type of key such as press keys, toggle keys, touch, virtual/soft keys, etc. Additionally, it should be noted that although the figures illustrate the first keypad as having six press keys and the second keypad as having four toggle keys, one skilled in the art will appreciate that the various embodiments of the invention are not necessarily so limited and that any suitable number, type, or combination of keys may be provided. The charger port 39 is configured to have a battery charger connected thereto to allow recharging of the battery 14.

The user-actuated hand control system 20 generally allows the user to control the various functions of the wheelchair. For example, the user-actuated hand control system 20 operates with the control system of the controller 24 or a seat or auxiliary module (or auxiliary seating module) 25 to provide functions that include, but need not be limited to, starting and stopping motive power to the drive wheels 16, controlling the direction of rotation and speed of rotation of the drive wheels 16, controlling a pointing direction of the wheels 18 to provide steering of the wheelchair 10, controlling a seat function, and controlling auxiliary functions. According to various example embodiments of the invention, the user-actuated hand control system 20 may be directly connected to the controller 24 (such as by a cable, for example).

The user-actuated hand control system 20 provides improvements over single keypad conventional configurations by allowing for operation of the personal mobility vehicle 10 with user input from a keypad in front of the joystick, and/or for operation of the personal mobility vehicle 10 with user input from a keypad behind the joystick.

Figure 5:
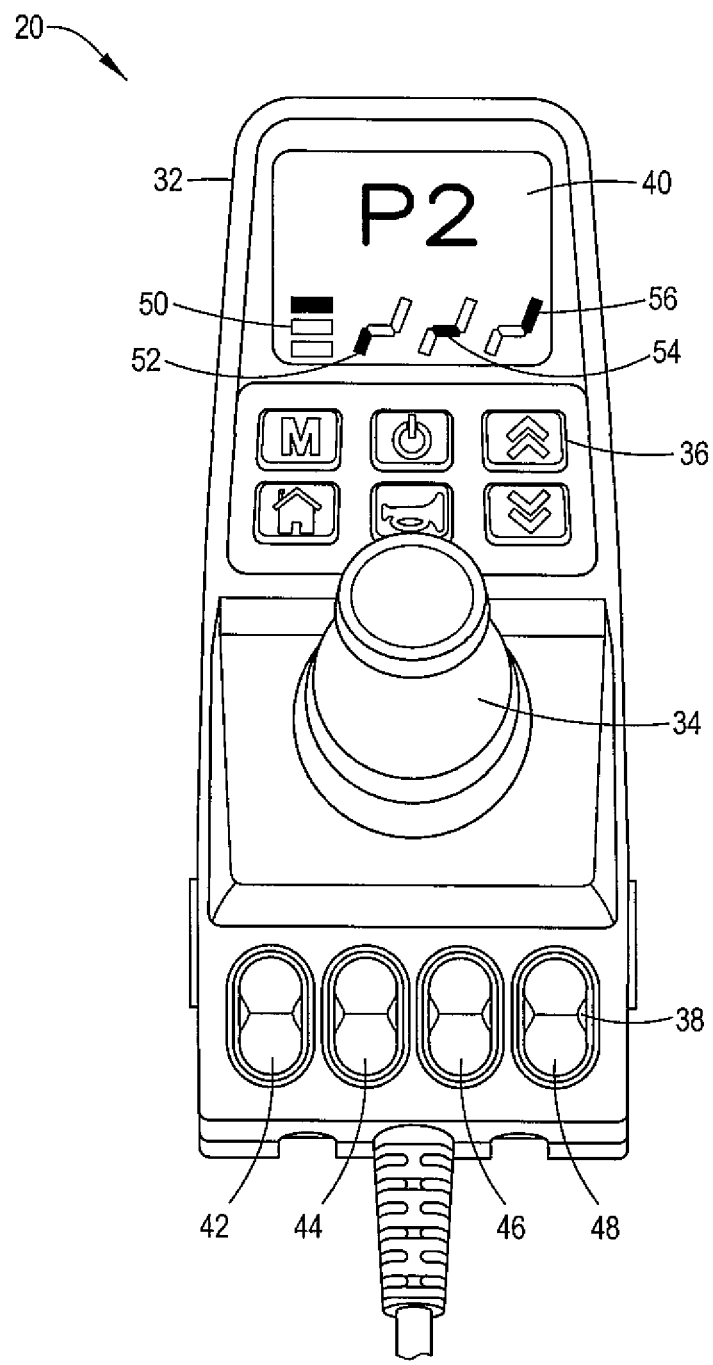
FIG. 5 is a top view of the personal mobility vehicle hand control shown in FIG. 4.

Referring now also to FIG. 5, there is shown an example configuration of the keys of the keypads 36, 38, wherein the current functions of the keys on the second keypad 38 are displayed in an area of the display 40. For example, key 42 of the second keypad 38 corresponds to a first area 50 of the display 40 and shows that there is more than just one set of functions. The active set of functions can be chosen by operating this key 42. Key 44 of the second keypad 38 corresponds to a second area 52 of the display 40 and based on the currently chosen function set, key 44 shows a function for "leg adjustment". Key 46 of the second keypad 38 corresponds to a third area 54 of the display 40 and based on the currently chosen function set, key 46 shows a function for "seat elevate". Key 48 of the second keypad 38 corresponds to a fourth area 56 of the display 40 and based on the currently chosen function set, key 48 shows a function for "backrest adjustment". In some other alternative embodiments, there may be just one set of functions for the keys. In this case, key 42 would have a certain, singular function, however any suitable configuration may be provided.

Figure 6:
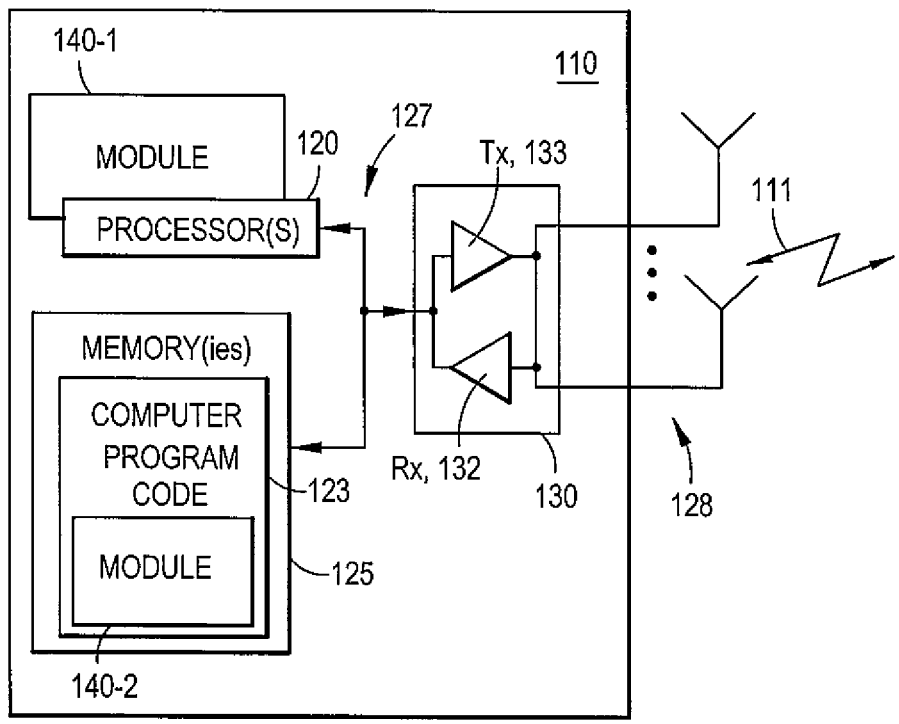
FIG. 6 is a diagram illustrating some of the components of the user equipment shown in FIG. 1.

As noted above, the wheelchair 10 comprises a communications section 30. In the example shown in FIG. 1, the communications section 30 is configured to communicate with a user equipment (UE) 110, such as a smartphone for example. An example of some of the components in the UE 110 is shown in FIG. 6. The user equipment (UE) 110 may be in wireless communication with a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a function/operation module 140, comprising one of or both parts 140-1 and/or 140-2, which may be implemented in a number of ways. The function/operation module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN (radio access mode) via a wireless link 111. In an alternate example, rather than having the communications section 30 using the UE 110 to communicate, the wheelchair 10 may additionally or alternatively comprise the communications section 30' which comprises a user equipment (UE) having the components described in reference to FIG. 6. This may be, for example, a UE capable of 4G or 5G communications to a wireless network node or radio access node (RAN).

Figure 7:
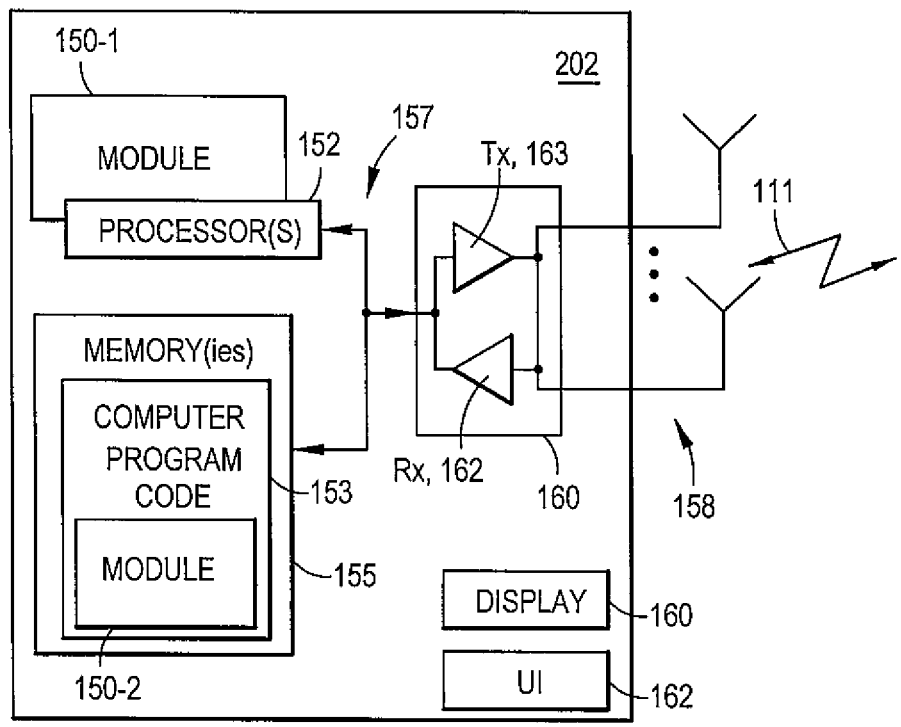
FIG. 7 is a diagram illustrating some of the components of the remote device shown in FIG. 1.

As seen in FIG. 1, with features as described herein, a remote diagnostics connection may be provided between the wheelchair 10 and a remote device 202. Referring also to FIG. 7, the remote device 202 running the remote ECON instance 150 generally comprises one or more processors 152, one or more memories 155, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153.

The remote device 202 includes a function/operation module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the remote device 202 to perform one or more of the operations as described herein. The remote device 202, as shown in FIG. 7, further comprises a display 160 and a user interface 162, such as a keyboard or touch screen for example.

The following abbreviations that may be found in the specification and/or the drawing figures are defined as follows:
 ECON-R: Software which is locally connected to the eX1 wheelchair system 10 and which acts as gateway to a remote instance
 Remote ECON instance: An ECON program running on any platform which can connect to ECON-R
 Q3DC: Quantum Access Level Cloud Service (q3dc.quantumrehab.com)
 Message Broker: Internet based service which acts as message broker between two instances (between ECON-R and Remote ECON instance)
 Wheelchair user: User which operates the wheelchair 10
 Session: One connection from a remote ECON instance to a wheelchair through an ECON-R instance
 Access Level: Specific access level which is used for each unique user who wants to use a specific programming device (Remote ECON instance, ECON-i, ECON-R)

A remote diagnostics connection may be primarily initiated by a wheelchair user/caregiver by using a mobile phone app, such as module 140 or second apparatus 140 for example, running on the UE 110. The app may locally connect to the wheelchair 10 through BLUETOOTH (or CAN) and the communications section 30 as shown by 31 in FIG. 1, and remotely connects to a message broker 200. This may cause a new channel being opened between the ECON-R and the Remote ECON instance. Subsequent, the user/caregiver may communicate a channel number and a passcode to a remote technician/dealer (e.g. by phone) who is at the remote device 202. The remote technician/dealer may then use this information at the remote device 202 to establish a connection to the wheelchair 10 by using the remote ECON instance 150, where the remote ECON instance 150 is configured to provide existing wheelchair configuration and diagnostics tool used for local access through the BLUETOOTH/CAN connection 31.

It should be noted that although a BLUETOOTH or CAN connection is mentioned above, features as described herein are not limited to this connections. Alternate embodiments may instead provide any suitable type of wireless connection and/or wired connection. Future systems may have the communication device embedded in the wheelchair 10, such as at communications section 30' for example. In such a case, the mobile app and use of a UE such as a smartphone 110 would not be needed. The communications section 30' would be the UE.

For access to the wheelchair 10, the ECON-R operating on the UE 110, such as via module 140, and the Message Broker 200 act as communication gateway only. The ECON-R app 140 running on the UE 110 has no knowledge about what is being accessed. The UE 110 merely re-routes the requests coming from the remote ECON instance 150 running at the remote device 202, to the wheelchair 10. Therefore, all wheelchair features available natively on the wheelchair are also available through the remote connection by the remote ECON instance 150 at the remote device 202.

The communication between ECON-R 140 and the remote ECON instance 150 is preferably end-to-end encrypted. The message broker 200 acts as gateway only, and has no knowledge about the content. Data is neither stored in the cloud or Internet 300, nor easily accessible inbetween the ECON-R 140 and the remote ECON instance 150. It is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

With features as described herein, the remote ECON instance 150 may be configured to remotely display content on the display 160 of the remote device 202 which is also displayed on the display 40 of the wheelchair 10. The remote display content may be abstracted by a proprietary display description language for transmission through the message broker 200 to reduce bandwidth to a minimum. Screen rendering may, thus, be done remotely on ECON-W side at the remote device 202. With a display mirroring mechanism, the display content, as an abstract data stream is re-interpreted on the receiver side. With this feature, data for a full screen only takes a few bytes to transmit. This makes it possible to do the screen mirroring over a low bandwidth connection. Beside remote diagnostics, display mirroring could be also used for different applications, i.e. training, mirror to smartphone as secondary display, etc.

Some examples of use cases for the various example embodiments are described below.

In an example use case where the wheelchair user needs help, this may comprise:
 Wheelchair user needs help due to an issue with his wheelchair/electronics
 Wheelchair user calls dealer via telephone, and the dealer instructs the wheelchair user to start ECON-R
 Wheelchair user starts ECON-R, connect to the UE to the wheelchair, and passes the channel number and secret code to the dealer via the telephone call
 Dealer starts remote diagnostics session, and wheelchair user may confirm this session on his wheelchair
 Dealer has read/write access to settings on the wheelchair 10 based on the dealer's access level
 Dealer can see remote display mirror of the display 40 on the display 160, and the dealer may instruct the user on phone to do certain actions The term "access level" generally describes the level of access a person can get to access specific features. The higher the access level (top is "Developer") the more a person can configure in the system, the lower the access level (lowest is "User") the less the person can configure. For example, a user might only be able to change screen brightness and horn volume, whereas a developer can change every single parameter on the system.

In an example use case where the dealer needs help, this may comprise:
 Dealer is on-site at customer (wheelchair customer)
 Dealer does not know how to fix a problem (e.g. which setting is needed)
 Dealer calls his headquarter office/provider to ask for help Dealer starts ECON-R via his/her UE, logs in with the dealer's own credentials to Q3DC, connects his/her UE to the wheelchair, and passes channel number and secret code to remote expert Remote expert opens the remote ECON instance 150, logs in with the remote expert's own credentials to Q3DC, the remote expert then starts remote connection to wheelchair Remote expert can read and write to settings on the wheelchair 10 based on the dealer's access level With features as described herein, the remote ECON instance 150 may be used to connect to a remote wheelchair system 10 via a gateway provided by ECON-R 140. This may include, for example:

Acceptance Criteria:
System configuration can be accessed by remote ECON instance without direct connection to the wheelchair.
Precondition:
System is up and running.
ECON-R is connected to the system.
ECON-R provides a channel ID and passcode to authorize remote ECON instance to connect.
Trigger:
ECON-R accepts matching Channel ID and passcode from remote ECON instance.
Postcondition:
The system configuration is loaded to remote ECON instance.

In some example embodiments the remote ECON instance 150 may not have direct access to the filesystem of the connected wheelchair 10. The ECON-R may be configured to download the whole filesystem from the wheelchair 10 on request, and send the filesystem to the remote ECON instance. ECON-R may keep the filesystem in a cache to speed up access to the filesystem.

According to various example embodiments, ECON-R may provide an interface to clear an internal file cache of the wheelchair 10 on demand. Thus, the remote ECON instance 150 may be used to clear the file cache in the wheelchair the same way as if the remote device 202 was connected directly to the wheelchair 10 through CAN or BTH (BLUETOOTH) 31. Steps may comprise, for example:

Requested by user: Settings->Delete Cache Files
Automatically: If obtained file is corrupt.
Magic/Crc error.
Network Communication Network communication for the various example embodiments may be provided as indicated with the following non-limiting examples:

All connections to all Internet services may be secured by providing end-to-end encryption.
An initial bandwidth and latency test may be done for every new connection. This shall ensure that timing constraints can be met. In case of a non-conforming connection, the user may be informed and the connection may not be established.
A traffic light may be shown to indicate the connection status (Quality of Service).
In some example embodiments, a local connected embedded device may act as ECON-R instance (Internet-of-Things (IoT)).
The connection may be identified by a channel number and may be secured by a shared secret.
Channel number and shared secret may be communicated over another independent communication channel between ECON-R and the remote ECON instance user (e.g. telephone).

The channel number and the shared secret may be numeric.
The channel number may have at maximum 8 digits.
The shared secret may have at maximum 4 digits.
The channel number for a connection to specific chair may be the same within multiple sessions (e.g. wheelchair A always has channel number 1000001 whereas wheelchair B has always channel number 1000002).
The shared secret may change for every session (even when connected to the same chair).
The channel number definition
Channel number may be generated from the serial number of connected "Logical master" device.
Channel number may be generated like this:
serial number: 123
123->(padding left, fill with 0) 0123->(padding right, fill with 0) 01230000
Write access and authentication status
The remote ECON instance may be informed about authentication status and read/write status.
It can happen that the Interactive assist app will lose write access authorization (timeout during fileaccess).
In such case, authentication assist may automatically start authentication process.
During this process:
The remote ECON instance may inform the user that Interactive assist user have to confirm remote access to Q-Logic 3 system.
The remote ECON instance has only read access
Programmer state cannot be triggered
All system write features have to be deactivated
System Connection Management The following is a non-limiting example of system connection management:

Acceptance Criteria:
According to user settings:
ECON-R automatically connects the last connected system.
ECON-R provides a list with available systems and connects the system selected by the user.
Precondition:
System is up and running.
System user allows Bluetooth access for ECON.
System is in reach of ECON's Bluetooth signal.
System user accepts Bluetooth access by programming device.
Postcondition:
ECON-R provides a channel ID and passcode to authorize ECON to connect remotely.
ECON-R provides a gateway for ECON to access the system configuration remotely.

System connection management for the various example embodiments may be provided as indicated with the following non-limiting examples:

ECON-R may connect to the wheelchair system by using Bluetooth or CAN.
Limit device list: ECON-R may limit the list of available devices for connection to eX1 wheelchair systems.
Acceptance Criteria:
The accessory list does not show any mobile phones or other devices that are not supported by Interactive Assist.
The user may confirm every remote access on the wheelchair system in the similar way he needs to accept a new Bluetooth connection access. The confirmation may not show up for the ECON-R to system connection. The confirmation may be shown as soon as the remote ECON instance starts connection through ECON-R.

The Q3DC user ID of the remote ECON user may be used for authentication towards the eX1 system.

ECON-R may show the highest resulting read and write access level independently.

The remote ECON instance may show the highest resulting read and write access level independently.

In case of disconnection initiated from ECON-R user or remote ECON user, the other user shall be notified that the connection was intentionally terminated.

In case of disconnect initiated from remote ECON while system is in configurable system state, the remote ECON user may prior be asked if he wants to switch system back to normal system state.

A remote connection may be terminated upon powering off of the wheelchair system, loss of connection from wheelchair system to ECON-R or loss of connection from ECON-R/remote ECON instance to internet/web portal. Reconnection after loss may be prevented from being automated.

A connection may be limited, such as to no longer than 1 hour for example. After this time the system may be configured to be automatically closed. A down counting timer may be shown to the ECON-R user and the remote ECON user.

Connection flow
  Interactive assist connection flow may comprise:
    1. The user logs in as a registered user in Q3DC or continues as a standard user
    2. ECON-R builds connection to the wheelchair via Bluetooth or CAN 31
    3. ECON-R opens channel to message broker 200
    4. ECON-R displays channel ID and secret number
  Remote ECON instance connection flow may comprise:
    1. The remote ECON instance 150 connects to provided channel
    2. The remote ECON instance sends initial message containing user data (userID, access level)
    3. ECON-R may authenticate with the remote ECON instance UserID on connected system
    4. The wheelchair may display user confirmation request
    5. ECON-R sends reply to the remote ECON instance containing own userID and access level
    6. The remote ECON instance shows connection information and current read- and write-access levels A System Connection Management Disclaimer may be provided for a user to accept a disclaimer before allowing a remote connection with ECON-R (ECON-R may prompt the user to explicitly accept a disclaimer before allowing the first remote connection to a wheelchair). This may include the following:
Acceptance criteria
  After installation of ECON-R the disclaimer is displayed.
  The user accepts the disclaimer by tapping a button "I agree".
  The user has the option to cancel the process.
  The user is not allowed a remote connection without accepting the disclaimer first.
  After accepting the disclaimer, a button/icon "Start search for devices" is enabled.
  ECON-R remembers that the user accepted the disclaimer, also after application updates.
Precondition:
  The user did not yet accept the disclaimer explicitly in ECON-R.

In a similar fashion, an acceptance of a disclaimer at the remote ECON instance may be required before starting a remote connection with the remote ECON instance (the remote ECON instance may prompt the user to explicitly accept a disclaimer before start of the first remote connection to a wheelchair). This may comprise, for example:
Acceptance Criteria:
  After clicking the button "Connect with Interactive Assist" a popup with the disclaimer is displayed.
  The user accepts the disclaimer by tapping a button "I agree" in the popup.
  The user has the option to cancel the process in the popup.
  The user cannot start a remote connection without accepting the disclaimer first.
  After accepting the disclaimer, the "Connect to Interactive Assist" popup is opened.
  The remote ECON instance remembers that the user accepted the disclaimer, also after application updates.
Precondition:
  The user did not yet accept the disclaimer explicitly in the remote ECON instance.

The system may be configured to inform a user of the UE 110 about disclaimer in ECON-R 140 (ECON-R may inform the user that he accepts a disclaimer when he allows a remote connection to a wheelchair). This may include, for example:
Acceptance Criteria:
  The user may be informed about the disclaimer before allowing a remote connection to a wheelchair.
  The information may be displayed above the button "Start search for devices"
  The information may include a link to the disclaimer.
  The information text may be as follows for example: "By clicking the button below you are acknowledging <<link to disclaimer>>."
Precondition:
  The user accepted the disclaimer explicitly after installation of ECON-R.

The system may be configured to inform a user of the remote device 202 about disclaimer in the remote ECON instance 150 (the remote ECON instance shall inform the user that he accepts a disclaimer when he starts a remote connection to a wheelchair). This may include, for example:
Acceptance Criteria:
  The user shall be informed about the disclaimer before starting a remote connection to a wheelchair.
  The information is displayed in the "Connect to Interactive Assist" popup above the OK-button.
  The information includes a link to the disclaimer.
  The information text is as follows: "By clicking OK you are acknowledging <<link to disclaimer>>."
Precondition:
  The user read and accepted the disclaimer explicitly upon his first remote connection with the remote ECON instance.

The system may be configured with an ECON-R Provider Login disclaimer: ECON-R may prompt the provider to explicitly accept a disclaimer before he can login to ECON-R. This may include, for example:

Acceptance Criteria:
  As soon as an "Enable" slider is set to "ON" the disclaimer is displayed.
  The provider accepts the disclaimer by tapping a button "I agree".
  The provider has the option to cancel the process, in this case the "Enable" slider is set back to "OFF".
  The provider cannot login to ECON-R without accepting the disclaimer first.
  After accepting the disclaimer, the provider can type in the credentials.
  The provider login disclaimer is shown every time the "Enable" slider is set to "ON".
System Connection Management Connection Log Each established connection between a wheelchair, ECON-R and the remote ECON instance may be logged to the Q3DC cloud platform 301 (also known as the access controller 301) in the log 302. The remote ECON instance may be responsible for the access log entry in the Q3DC cloud service. The following data may be logged for each connection:
  Date and time by start of connection in UTC time format.
  Date and time by end of connection in UTC time format.
  Reason for connection termination (e.g. "Session terminated by [user]/ECON-[x]", "Session terminated by timeout", "Session terminated due to lost connection")
  Remote ECON instance user ID
  Remote ECON instance IP
  Remote ECON instance Access Level
  ECON-R user ID
  ECON-R IP
  ECON-R Access Level
  Wheelchair serial number
  Logical Master serial number
  Powerbase serial number
  The connection log on Q3DC may be available on access level OEM or above.

Access Level & Configuration Access Policy

Access level and configuration access policy for the various example embodiments may be provided as follows.
  ECON-R and the remote ECON instance may be able to connect to Q3DC.
  ECON-R may ask to either login to Q3DC service to get access level of the ECON-R user or the option to continue with a user access level.
  ECON-R may not register itself as device to the cloud.
  The same Q3DC user may not be allowed to login on both sides (ECON-R/remote ECON instance; the users must differ.
  On ECON-R login may only be valid for the active app session; no access level offline time is supported.
  The highest write access level may be given by the lowest access level either on ECON-R or on the remote ECON instance.
  The highest read access level may be given by the access level of the remote ECON instance independent of the ECON-R access level.
  Remote ECON instance may run at least on dealer lever or above to offer remote diagnostics feature. User access level is not allowed to do remote access.
  The remote ECON instance may offer the possibility to switch between different read-only access level and read-write-access levels. E.g. read-only on OEM, but read-write on dealer level.

Access Level & Configuration Access Policy Change Log

ECON-R may show a log of what has been changed by who (remote user name) including a timestamp for each modification.
  Parameters may be indicated with Name, old value, new value
  Seat/MIO/IR/Photoalbum may be indicated with "xxxx configuration was changed" (e.g. Seat configuration was changed)
  Loading a seat preset may be shown explicitly with "Seat preset # XY loaded"
The change log for every session may be stored on the ECON-R.
The change log in ECON-R may be represented in the language configured on ECON-R (even if the remote ECON instance is running on different language).
The change log may include the chat content for the specific session between an ECON-R and remote ECON instance user shall be logged in ECON-R for each session. The following is a non-limiting example of acceptance criteria, trigger and postcondition:
Acceptance Criteria:
  The chat history is saved in the ECON-R chat log for the specific session date and time.
  The chat history includes all exchanged messages, pictures and videos.
Trigger:
  The chat function is used during a remote session.
Postcondition:
  The chat protocol can be deleted by the ECON-R user.
  The chat protocol is not available in Q3DC.
The change log may show the connection duration of the session (in the field which shows online the connection timer).
A change log history may be available in ECON-R for later review.
The change log history may be deleteable in ECON-R (all entries at once). The following is a non-limiting example:
Postcondition:
  Deleting the change log in ECON-R has no impact on the change log stored in the Q3DC cloud service.
The change log may be shown in remote ECON as reference. This log may be volatile and may be lost once session is closed.
Remote ECON Instance Features Features as described herein may be used to limit ECON functions for remote connection. For example, available functions if ECON is connected remotely may be:

| | |
|---|---|
| Read Parameters based on access level | YES |
| Write parameters based on access level | YES |
| Execute system functions | NO |
| Seat configuration based on access level | YES |
| MIO configuration | YES |
| Photoalbum | YES |
| IR configuration | YES |
| Device list view | YES |
| View error log | YES |
| View and log monitor values | YES |
| View and delete battery statistics based on access level | YES |
| Firmware update | NO |
| Set clock time | YES |
| Clone offline XPA | NO |
| Apply patch | NO |

ECON-R Features

ECON-R may be able to run in background to allow other functions to be used on the UE (e.g. make calls). In this case the open connection may be shown in notification area of the corresponding OS. This is needed to talk with the person which operates the remote ECON to share the shared secret.

1. If ECON-R is waiting for the remote party: Ready to accept. Interactive assist is waiting in background to accept remote connection.
2. If remote session is active: Connected. Interactive Assist session is active in background.

ECON-R may be available in following languages: English, Spanish, French, German, Italian, Portuguese. The default and fallback language may be English.

ECON-R may have following settings configurable in the App:
Company name
Contact name
Contact phone
Contact email
Client Name ECON-R Screen mode support (ECON-R may on mobile phone on all platforms will support only a Portrait mode. On tablets of all platforms may be supported Portrait and Landscape mode.)

When showing the channel/passcode it may be possible to generate an email to "Contact email" or call "Contact phone" directly out of the app.

ECON-R Features, User Interface

ECON-R features, user interface for the various example embodiments may be provided as follows:

Burger menu may have following entries:
Upper section:
Title "Provider Login"
"Enable" titled radio button
Lower section:
"User Settings"
"Bluetooth auto-connect"<ON/OFF> (default: on)
"Save login for IA session"<ON/OFF> (default: off)
"Contact Information"
"Connection Log"
"IA Tutorial"
"Quantum YouTube"
"Visit Quantum Rehab"
"About"

Select automatic Bluetooth connection: The user may be able to define if ECON-R should connect automatically to the latest connected system via Bluetooth. Features may provide, for example:

Acceptance Criteria:
The user can choose from following options:
Reconnect automatically to the last connected system after login. (default)
Provide selection list with available systems.
Postcondition:
If the user selected to reconnect automatically:
Upon start ECON-R attempts to connect to the latest connected system.
If last connected system is not available: provide selection list with available systems Select to save login credentials for session: the user shall be able to define if ECON-R may save the login credentials for the active session. This may include, for example:

Acceptance Criteria:
The user can choose from following options:
Keep login credentials for the active session.
Always provide login credentials if required (e.g. new connection) (default)
Precondition:
Dealer login is activated.
Postcondition:
Login credentials are always deleted upon session end (e.g. app time-out, deactivate dealer login, close app).

If no active Bluetooth connection is present, the Bluetooth device picker screen (iOS function) may be shown automatically when getting into "Search for devices" screen. Company name and contact name may be shown together with the channel/passcode. The user may be able to access help information for Q-Logic 3 from ECON-R. This may include, for example:

Acceptance Criteria:
ECON-R provides a link to external Q-Logic 3 help information (e.g. YouTube channel)
No maintenance effort is required to update help information in ECON-R (e.g. in case of ECON-R or system
Precondition:
External help information is provided under a fixed URL.
External help information is up-to-date.

Email to Provider: When showing the channel/passcode it may be possible to generate an email to "Contact email" by clicking on button "Mail provider". After clicking on this button, this may include, for example:

1. Check Email address validity
If not valid display "Email address is not valid !" Alert and cancel the sending process
2. Generate email:
Subject: Interactive assist connection details
Body:
Dear <contact name>,
Channel and passcode information to start Q-Assist connection:
Channel: <channel number>
Passcode: <secret key>
3. According to platform possibilities open email client and let user edit the generated email.

Call to Provider: when showing the channel/passcode it may be possible to call the "Contact phone" by clicking on button "Call provider". After clicking on this button, this may include, for example:

1. Check phone number validity
If not valid display "Phone number is not valid !" alert and cancel the calling process
2. According to platform possibilities call direct or open call/phone client with the configured phone number.

ECON-R Features, Connection Tutorial

ECON-R features, connection tutorial for the various example embodiments may be provided as follows:

ECON-R may support a simple tutorial to guide through the process connecting the application to the wheelchair system.

The tutorial may instruct the user by showing screenshots of the wheelchair system and by providing explanation graphics (e.g. graphic which illustrates the joystick to be pushed).

Remote Display:
   Remote display for the various example embodiments may be provided as follows:
      The remote ECON instance may be able to mirror the display of a connected wheelchair target.
      The remote display may be updated periodically, such as every 500 ms for example.
   Additional Communication:
   Additional communication for the various example embodiments may be provided as follows:
      ECON-R and the corresponding remote ECON instance may offer a textual chat. The, the users of ECON-R and remote ECON instance may be able to communicate via an integrated chat function. This may include, for example:
         Acceptance Criteria:
            Users can send text messages from ECON.
         Precondition:
            ECON-R and remote ECON instance are connected.
         Postcondition:
            The chat history is saved in the change log.
      Exchange pictures in chat function: the users of ECON-R and remote ECON instance may be able to exchange pictures via the integrated chat function. This may include, for example:
         Acceptance Criteria:
            User can send pictures from ECON.
            User has access to the photo library of his mobile device.
            User has access to the camera of his mobile device.
         Precondition:
            ECON-R and remote ECON instance are connected.
            Pictures are of the following file type: JPG, PNG.
            The maximum file size is 14 MB.
         Postcondition:
            The pictures are saved with the chat history in the change log.
      Exchange videos in chat function: The users of ECON-R and remote ECON instance may be able to exchange videos via an integrated chat function. This may include, for example:
         Acceptance Criteria:
            User can send videos from ECON.
            User has access to the video library of his mobile device.
            User has access to the camera of his mobile device.
         Precondition:
            ECON-R and remote ECON instance are connected.
            Videos are of the following file type: MP4.
            The maximum file size is 14 MB.
         Postcondition:
            The videos are saved with the chat history in the change log.

It should be noted that although the various example embodiments of the invention have been described in connection with the eX1 wheelchair system and eX1 based products, one skilled in the art will appreciate that the various example embodiments are not necessarily so limited and that in alternate embodiments the remote access/remote diagnostics system and features can be used in connection with any other suitable wheelchair system or mobility system.

Technical effects of any one or more of the example embodiments based on a peer to peer connection with end to end encryption. The connection is on-request and time limited. Both parties need to be online at the same time. When compared to conventional systems, live remote access and display and display mirror was never demonstrated for a wheelchair system.

An example method may be provided comprising: a remote device establishing an encrypted communication link with a user equipment, where the user equipment is associated with a wheelchair, where the encrypted communication link is established based at least partially upon a wheelchair identifier transmitted by the remote device which identifies the wheelchair, and where the remote device, as part of the encrypted communication link, communicates with a network through Internet and/or cloud computing; transmitting an access level by the remote device to an access controller, where the access controller is not located at the remote device and is not located at the user equipment; and receiving data by the remote device from the wheelchair via the use equipment and the network, where the data received by the remote device is limited corresponding to the access level of the remote device transmitted to the access controller.

The data may comprise data regarding the wheelchair which is displayed on a user interface of the wheelchair; and the method further comprises, based at least partially upon the receiving of the data, displaying the data regarding the wheelchair on a display of the remote device, where the data regarding the wheelchair is displayed on the display of the remote device substantially mirroring the display of the data regarding the wheelchair on a user interface of the wheelchair. The method may further comprise receiving by the remote device from the user equipment, via the encrypted communication link, text and/or a video and/or a photograph transmitted on the encrypted communication link via the user equipment; and displaying the received text and/or a video and/or a photograph with a display at the remote device.

An example embodiment may be provide in an apparatus comprising: at least one processor; and at least one non-transitory memory including computer program code, the at least one memory and the computer program code configured to, with the at least one processor, cause the apparatus to: transmit an access level by the apparatus to an access controller, where the access controller is not located at the apparatus; and receive wheelchair data by the apparatus from a use equipment, where the data received by the apparatus is received via an encrypted communication link between the apparatus and the user equipment, where the remote device, as part of the encrypted communication link, communicates with a network through Internet and/or cloud computing, where the user equipment is associated with the wheelchair, where the encrypted communication link is established based at least partially upon a wheelchair identifier transmitted by the apparatus which identifies the wheelchair, and where the data received by the apparatus is limited corresponding to the access level of the apparatus transmitted by the apparatus to the access controller.

An example embodiment may be provided in a non-transitory program storage device readable by a machine, tangibly embodying a program of instructions executable by the machine for performing operations, the operations comprising operations corresponding to the method described above.

An example method may be provide comprising: a user equipment establishing an encrypted communication link with a remote device, where the user equipment is associated with a wheelchair, where the encrypted communication link is established based at least partially upon a wheelchair identifier received by the user equipment which identifies the wheelchair, and where the encrypted communication link comprises use of a network comprising Internet and/or cloud computing as part of the encrypted communication link; the user equipment transmitting an access level to an access controller, where the access controller is not located at the remote device and is not located at the user equipment; and the user equipment transmitting data regarding the wheelchair to the remote device, where the transmitting of the data is limited corresponding to the access level of the user equipment transmitted to the access controller.

The access controller may control access of the remote device to the data based upon the access level transmitted to the access controller by the user equipment and an access level received by the access controller from the remote device. The method may further comprise the access controller recording a log of access by the remote device to the user equipment. The access controller may control read and write access of the remote device with date on the user equipment. The user equipment may reads and writes data with the wheelchair via a wireless link.

An example embodiment may be provided in an apparatus comprising: at least one processor; and at least one non-transitory memory including computer program code, the at least one memory and the computer program code configured to, with the at least one processor, cause the apparatus to: transmit an access level by the apparatus to an access controller, where the access controller is not located at the apparatus; and transmit data by the apparatus regarding a wheelchair to a remote device, where the transmitting of the data is limited corresponding to the access level of the apparatus transmitted to the access controller, where the data transmitted by the apparatus is transmitted via an encrypted communication link, with a network with use of Internet and/or cloud computing as part of the encrypted communication link, between the apparatus and the remote device, where the apparatus is associated with the wheelchair, where the encrypted communication link is established based at least partially upon a wheelchair identifier received by the apparatus which identifies the wheelchair.

An example embodiment may be provided in a non-transitory program storage device readable by a machine, tangibly embodying a program of instructions executable by the machine for performing operations, the operations comprising operations corresponding to the method as described above.

An example method may be provide comprising: receiving wheelchair data by a remote device, where the wheelchair data is received by the remote device from a user equipment via an encrypted communication link through a network with use of Internet and/or cloud computing as part of the encrypted communication link, and where the wheelchair data comprises data regarding the wheelchair which is displayed on a user interface of the wheelchair; and based, at least partially, upon the receiving of the wheelchair data, displaying the data regarding the wheelchair on a display of the remote device, where the data regarding the wheelchair is displayed on the display of the remote device substantially mirroring the display of the data regarding the wheelchair on the user interface of the wheelchair.

The method may further comprise receiving by the remote device from the user equipment, via the encrypted communication link, text and/or a video and/or a photograph transmitted on the encrypted communication link via the user equipment; and displaying the received text and/or a video and/or a photograph by the remote device.

An example embodiment may be provided in an apparatus comprising: at least one processor; and at least one non-transitory memory including computer program code, the at least one memory and the computer program code configured to, with the at least one processor, cause the apparatus to: receive wheelchair data by the apparatus, where the wheelchair data is received by the apparatus from a user equipment via an encrypted communication link through a network with use of Internet and/or cloud computing as part of the encrypted communication link, and where the wheelchair data comprises data regarding the wheelchair which is displayed on a user interface of the wheelchair; and based, at least partially, upon the receiving of the wheelchair data, displaying the data regarding the wheelchair on a display of the apparatus, where the data regarding the wheelchair is displayed on the display of the apparatus substantially mirroring the display of the data regarding the wheelchair on the user interface of the wheelchair.

An example embodiment may be provided in a non-transitory program storage device readable by a machine, tangibly embodying a program of instructions executable by the machine for performing operations, the operations comprising operations corresponding to the method as described above.

An example method may be provided comprising: establishing an encrypted communication link between a remote device and a user equipment, where the user equipment is associated with a wheelchair, where the encrypted communication link is established based at least partially upon a wheelchair identifier transmitted by the remote device which identifies the wheelchair, and where the remote device communicates through a network as part of the encrypted communication link; receiving by the remote device from the user equipment, via the encrypted communication link, wheelchair data regarding the wheelchair; receiving by the remote device from the user equipment, via the encrypted communication link, text and/or a video and/or a photograph transmitted on the encrypted communication link via the user equipment; and displaying the received text and/or a video and/or a photograph by the remote device.

An example embodiment may be provided in an apparatus comprising: at least one processor; and at least one non-transitory memory including computer program code, the at least one memory and the computer program code configured to, with the at least one processor, cause the apparatus to: receive by the apparatus from a user equipment, via an encrypted communication link, wheelchair data regarding the wheelchair; receive, via the encrypted communication link, by the apparatus from the user equipment text and/or a video and/or a photograph transmitted on the encrypted communication link; and display the received text and/or a video and/or a photograph by the remote device, where the wheelchair data received by the apparatus via the encrypted communication link is received through a network gateway as part of the encrypted communication link, where the user equipment is associated with the wheelchair, where the encrypted communication link is established based at least partially upon a wheelchair identifier received by the apparatus which identifies the wheelchair, and where the data received by the apparatus is limited corresponding to the access level of the apparatus transmitted by the apparatus to the access controller.

An example embodiment may be provided in a non-transitory program storage device readable by a machine, tangibly embodying a program of instructions executable by the machine for performing operations, the operations comprising operations corresponding to the method as described above.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
    a remote device establishing an encrypted communication link with a user equipment, where the user equipment is associated with a wheelchair, where the encrypted communication link is established based at least partially upon a wheelchair identifier transmitted by the remote device which identifies the wheelchair, and where the remote device, as part of the encrypted communication link, communicates with a network through Internet and/or cloud computing;
    transmitting an access level by the remote device to an access controller, where the access controller is not located at the remote device and is not located at the user equipment; and
    receiving data by the remote device from the wheelchair via the user equipment and the network, where the data received by the remote device is limited corresponding to the access level of the remote device transmitted to the access controller.

2. The method as claimed in claim 1 where the data comprises information regarding the wheelchair which is displayed on a user interface of the wheelchair; and the method further comprises, based at least partially upon the receiving of the data, displaying the data regarding the wheelchair on a display of the remote device, where the data regarding the wheelchair is displayed on the display of the remote device substantially mirroring the display of the data regarding the wheelchair on a user interface of the wheelchair, and where the method further comprises use of a display description language that reduces the need for raw data transmission, thereby reducing bandwidth requirements.

3. The method as claimed in claim 1 where the method further comprises receiving by the remote device from the user equipment, via the encrypted communication link, text and/or a video and/or a photograph transmitted on the encrypted communication link via the user equipment; and displaying the received text and/or a video and/or a photograph with a display at the remote device.

4. The method as claimed in claim 1, wherein the operations are performed at least in part using a non-transitory program storage device readable by a machine, tangibly embodying a program of instructions executable by the machine for performing the operations.

5. The method as in claim 1 where the encrypted communication link is established based at least partially upon the wheelchair identifier received by the user equipment which identifies the wheelchair, the method further comprising:
    the user equipment transmitting the access level to the access controller; and
    the user equipment transmitting the data regarding the wheelchair to the remote device, where the transmitting of the data is limited corresponding to the access level of the user equipment transmitted to the access controller.

6. The method as in claim 5 where the access controller controls access of the remote device to the data based upon the access level transmitted to the access controller by the user equipment and the access level received by the access controller from the remote device.

7. The method of claim 5 further comprising the access controller recording a log of access by the remote device to the user equipment.

8. The method of claim 5 where the access controller controls read and write access of the remote device with data on the user equipment.

9. The method of claim 5 where the user equipment exchanges data with the wheelchair via a wireless link.

10. An apparatus comprising:
    at least one processor; and
    at least one non-transitory memory including computer program code, the at least one memory and the computer program code configured to, with the at least one processor, cause the apparatus to:
        transmit an access level by a remote device to an access controller, where the access controller is not located at the remote device; and
        receive wheelchair data by the remote device from a user equipment,
        where the data received by the remote device is received via an encrypted communication link between the remote device and the user equipment, where the remote device, as part of the encrypted communication link, communicates with a network through Internet and/or cloud computing, where the user equipment is associated with the wheelchair, where the encrypted communication link is established based at least partially upon a wheelchair identifier transmitted by the remote device which identifies the wheelchair, and where the data received by the remote device is limited corresponding to the access level of the remote device transmitted by the remote device to the access controller.

11. A method comprising:
    a user equipment establishing an encrypted communication link with a remote device, where the user equipment is associated with a wheelchair, where the encrypted communication link is established based at least partially upon a wheelchair identifier received by the user equipment which identifies the wheelchair, and where the encrypted communication link comprises use of a network comprising Internet and/or cloud computing as part of the encrypted communication link;

the user equipment transmitting an access level to an access controller, where the access controller is not located at the remote device and is not located at the user equipment; and the user equipment transmitting data regarding the wheelchair to the remote device, where the transmitting of the data is limited corresponding to the access level of the user equipment transmitted to the access controller.

12. The method of claim 11 where the access controller controls access of the remote device to the data based upon the access level transmitted to the access controller by the user equipment and an access level received by the access controller from the remote device.

13. The method of claim 11 further comprising the access controller recording a log of access by the remote device to the user equipment.

14. The method of claim 11 where the access controller controls read and write access of the remote device with data on the user equipment.

15. The method of claim 11 where the user equipment exchanges data with the wheelchair via a wireless link.

16. An apparatus comprising:
at least one processor; and
at least one non-transitory memory including computer program code, the at least one memory and the computer program code configured to, with the at least one processor, cause the apparatus to:
transmit an access level by a second apparatus to an access controller, where an access controller is not located at the second apparatus; and
transmit data by the second apparatus regarding a wheelchair to a remote device, where the transmitting of the data is limited corresponding to the access level of the second apparatus transmitted to the access controller,
where the data transmitted by the second apparatus is transmitted via an encrypted communication link, with a network with use of Internet and/or cloud computing as part of the encrypted communication link, between the second apparatus and the remote device, where the second apparatus is associated with the wheelchair, where the encrypted communication link is established based at least partially upon a wheelchair identifier received by the second apparatus which identifies the wheelchair.

17. A method comprising:
receiving wheelchair data by a remote device, where the wheelchair data is received by the remote device from a user equipment via an encrypted communication link through a network with use of Internet and/or cloud computing as part of the encrypted communication link, and where the wheelchair data comprises data regarding the wheelchair which is displayed on a user interface of the wheelchair; and
based, at least partially, upon the receiving of the wheelchair data, displaying the data regarding the wheelchair on a display of the remote device, where the data regarding the wheelchair is displayed on the display of the remote device substantially mirroring the display of the data regarding the wheelchair on the user interface of the wheelchair, and where the method further comprises use of a display description language that reduces the need for raw data transmission, thereby reducing bandwidth requirements.

18. The method of claim 17 further comprising:
receiving by the remote device from the user equipment, via the encrypted communication link, text and/or a video and/or a photograph transmitted on the encrypted communication link via the user equipment; and
displaying the received text and/or a video and/or a photograph by the remote device.

19. An apparatus comprising:
at least one processor; and
at least one non-transitory memory including computer program code, the at least one memory and the computer program code configured to, with the at least one processor, cause the apparatus to:
receive wheelchair data by a second apparatus, where the wheelchair data is received by the second apparatus from a user equipment via an encrypted communication link through a network with use of Internet and/or cloud computing as part of the encrypted communication link, and where the wheelchair data comprises data regarding the wheelchair which is displayed on a user interface of the wheelchair; and
based, at least partially, upon the receiving of the wheelchair data, displaying the data regarding the wheelchair on a display of the second apparatus, where the data regarding the wheelchair is displayed on the display of the second apparatus substantially mirroring the display of the data regarding the wheelchair on the user interface of the wheelchair, and where use of a display description language reduces the need for raw data transmission, thereby reducing bandwidth requirements.

20. A method comprising:
establishing an encrypted communication link between a remote device and a user equipment, where the user equipment is associated with a wheelchair, where the encrypted communication link is established based at least partially upon a wheelchair identifier transmitted by the remote device which identifies the wheelchair, and where the remote device communicates through a network as part of the encrypted communication link, and where data received by the remote device is limited corresponding to an access level of the remote device transmitted to an access controller;
receiving by the remote device from the user equipment, via the encrypted communication link, wheelchair data regarding the wheelchair;
receiving by the remote device from the user equipment, via the encrypted communication link, text and/or a video and/or a photograph transmitted on the encrypted communication link via the user equipment; and
displaying the received text and/or a video and/or a photograph by the remote device.

21. An apparatus comprising:
at least one processor; and
at least one non-transitory memory including computer program code, the at least one memory and the computer program code configured to, with the at least one processor, cause the apparatus to:
receive by a remote device from a user equipment, via an encrypted communication link, wheelchair data regarding the wheelchair;
receive, via the encrypted communication link, by the remote device from the user equipment text and/or a video and/or a photograph transmitted on the encrypted communication link; and
display the received text and/or a video and/or a photograph by the remote device,
where the wheelchair data received by the remote device via the encrypted communication link is received through a network gateway as part of the encrypted communication link, where the user equipment is associated with the wheelchair, where the encrypted communication link is established based at least partially upon a wheelchair identifier received by the remote device which identifies the wheelchair, and where the data received by the remote device is limited corresponding to the access level of the remote device transmitted by the remote device to the access controller.

* * * * *